United States Patent
Cheever et al.

(10) Patent No.: US 6,275,882 B1
(45) Date of Patent: *Aug. 14, 2001

(54) METHOD AND APPARATUS FOR PROVIDING A HOT DOCKING INTERFACE FOR TRANSMITTING DIGITAL VIDEO DATA

(75) Inventors: Gari L. Cheever, Palo Alto; Kal Krishnan, Fremont, both of CA (US); Robert Frankenberg, Alpine, UT (US)

(73) Assignee: Encanto Networks, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,142

(22) Filed: Sep. 30, 1997

(51) Int. Cl.⁷ .................................................. G06F 13/40
(52) U.S. Cl. .......................... 710/103; 710/102; 710/129; 710/62; 710/63; 710/72
(58) Field of Search ................................... 395/281–283, 395/882–885, 892–894, 500; 235/472, 492; 710/129

(56) References Cited

U.S. PATENT DOCUMENTS

| | | | |
|---|---|---|---|
| 5,052,943 | * 10/1991 | Davis | 439/298 |
| 5,598,537 | * 1/1997 | Swanstorm et al. | 395/281 |
| 5,625,829 | * 4/1997 | Gephardt et al. | 395/800.01 |
| 5,798,951 | * 8/1998 | Cho et al. | 364/708.1 |
| 5,826,043 | * 10/1998 | Smith et al. | 395/281 |
| 5,832,237 | * 11/1998 | Lee | 395/281 |
| 5,832,300 | * 11/1998 | Lowthert | 395/853 |
| 5,848,266 | * 12/1998 | Scheurich | 395/558 |
| 5,881,317 | * 3/1999 | Hampsten et al. | 710/62 |
| 5,918,073 | * 6/1999 | Hewitt | 710/52 |
| 5,919,261 | * 7/1999 | Aoki et al. | 713/300 |
| 5,928,337 | * 7/1999 | Wieringa | 710/5 |
| 5,978,807 | * 11/1999 | Mano et al. | 707/10 |
| 6,040,873 | * 3/2000 | Izumi et al. | 348/559 |

* cited by examiner

Primary Examiner—Ayaz R. Sheikh
Assistant Examiner—Raymond N Phan
(74) Attorney, Agent, or Firm—Blakely Sokoloff Taylor &Zafman

(57) ABSTRACT

A method and apparatus for providing a hot docking interface for transmitting multimedia data. In one embodiment, a hot docking interface is provided on a computer system and a second hot docking interface is provided on a multimedia device. When the hot docking interfaces are placed in contact with each other, multimedia data may automatically be transmitted between the computer system and the multimedia device. The hot docking feature of the hot docking interfaces allows the multimedia device to be placed in contact with the computer system, when the computer system is powered on, and, in response, data is automatically transferred. No cables, wire, or pin sockets are necessary. Moreover, in one embodiment, the hot docking interface of the computer system will provide power to the hot docking interface of the multimedia device to have the multimedia device transfer the data. Moreover, in one embodiment of the present invention, the hot-docking interfaces are configured to enhance the transmission of multimedia data by transmitting the multimedia data in accordance with the IEEE 1394 standard, published in 1995, sometimes referred to as the FireWire™ communication protocol.

27 Claims, 3 Drawing Sheets

METHOD AND APPARATUS FOR PROVIDING A HOT DOCKING INTERFACE FOR TRANSMITTING DIGITAL VIDEO DATA

FIELD OF THE INVENTION

The present invention relates to the field of computer systems, and in particular, the interface or connection between computer systems and multimedia devices for transferring multimedia data.

BACKGROUND OF THE INVENTION

Presently to interconnect multimedia devices (e.g., compact disc (CD) players/recorders, digital video recorders, digital cameras, televisions, tape cassette players, stereos etc.) in order to transmit data between the devices, various cables are typically used. The use of cables to interconnect the multimedia devices, however, has various draw backs.

For example, if several multimedia devices are interconnected, the various cables/wires interconnecting the devices can become entwined with each other. As a result, the entwining of the cables can make it difficult to connect and disconnect the multimedia devices from each other, and, possibly create a fire hazard if the protective outer layer of the cables become eroded or worn.

One solution to the use of cables for interconnecting the multimedia devices is the use of infrared light waves as a method of transmitting data/information between two electronic devices, in place of cables. However, the communication of data/information between the multimedia devices via infrared is unfortunately slow, and as a result, hinders the performance of the multimedia devices. In addition, while transferring the information, the infrared beam can be easily interrupted, especially during long durations of transferring the information, thereby causing a further slowdown in the transmission of the data.

As a result, there is a need for an interface/connection between multimedia devices that allows the multimedia devices to transmit data without the physical limitations or drawbacks of using cables, while also transmitting the data at a bandwidth that enhances the multimedia performance.

SUMMARY OF THE INVENTION

The present invention provides a hot docking interface for transmitting multimedia data. In one embodiment, a first hot docking interface is provided on a computer system and a second hot docking interface is provided on a multimedia device. When the hot docking interfaces are placed in contact with each other, multimedia data may automatically be transmitted between the computer system and the multimedia device.

The hot docking feature of the hot docking interfaces allows the multimedia device to be placed in contact with the computer system when the computer system is powered on, and to have the data automatically transferred thereafter. No cables or wires are necessary. Moreover, in one embodiment, the hot docking interface of the computer system will provide power to the hot docking interface of the multimedia device to allow the multimedia device to transfer the data.

Moreover, in one embodiment of the present invention, the hot-docking interfaces are configured to enhance the transmission of multimedia data (e.g., video data, graphics data, audio data). More specifically, the hot-docking interfaces include logic that implements data communication protocol that is able to transmit data at a higher band width. For example in one embodiment, the logic of the hot-docking interfaces transmit the multimedia data in accordance with the IEEE 1394 standard, sometimes referred to as the FireWire™ communication protocol.

BRIEF DESCRIPTION OF THE DRAWINGS

The present invention is illustrated by way of example and not limitation in the figures of the accompanying drawings, in which.

DETAILED DESCRIPTION

A method and apparatus are described for providing a hot docking interface for transmitting multimedia data. In the following description, numerous specific details are set forth in order to provide a thorough understanding of the present invention. It will be apparent, however, to one of ordinary skill in the art, that the present invention may be practiced without these specific details. In other instances, well-known standards, structures, and techniques have not been shown in order not to unnecessarily obscure the present invention.

Figure 1:
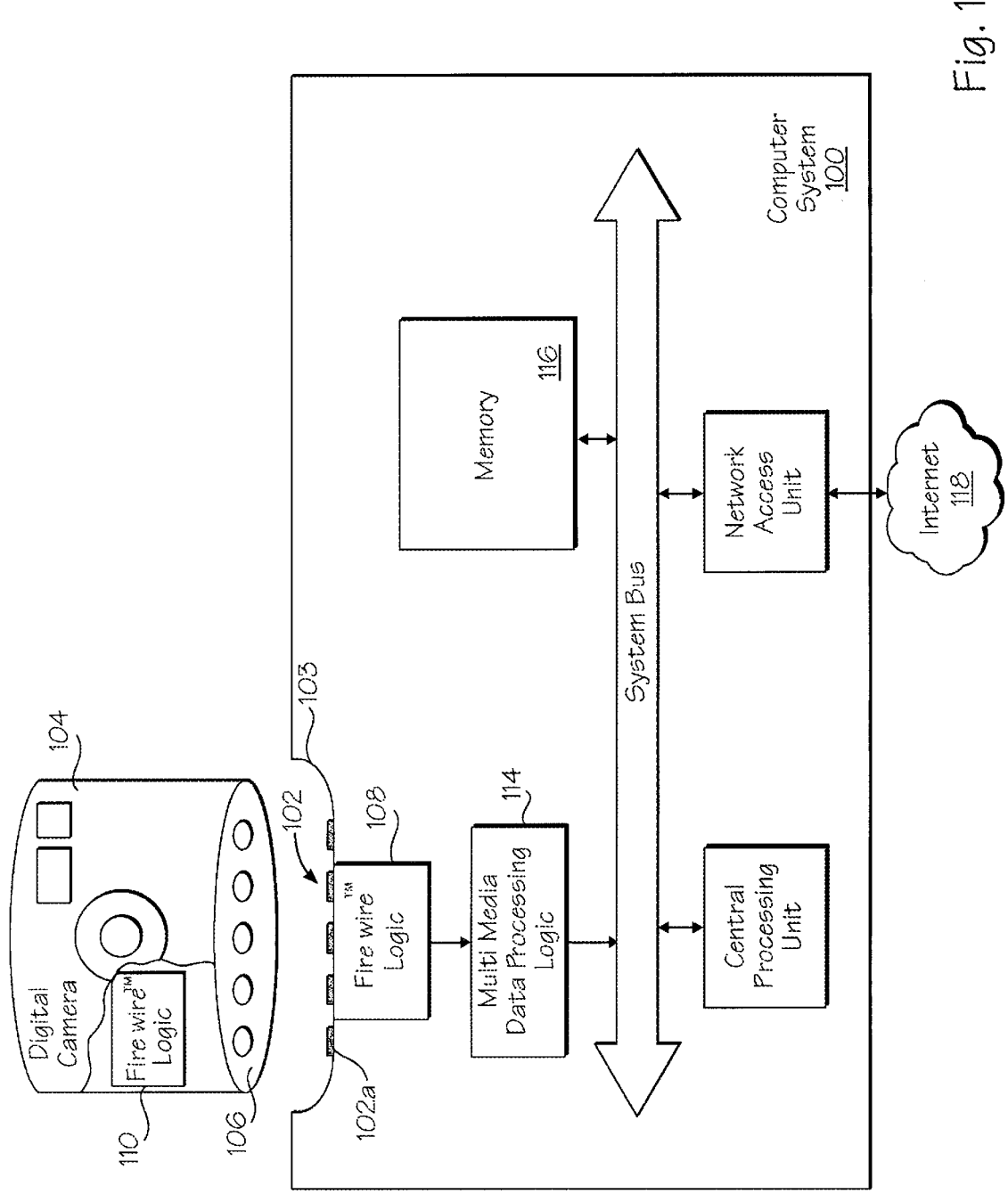
FIG. 1 illustrates a block diagram of a computer system and a cut-away view of a multimedia device both incorporating one embodiment of the present invention.

FIG. 1 illustrates a block diagram of one embodiment of the present invention, wherein a computer system 100 is shown having a hot docking interface/connection 102, which allows the computer system to transmit/receive data with a separate multimedia device 104, which is also shown to have a hot-docking interface 106. The interfaces are considered to be "hot-docking" because contact can be made between the interfaces when the computer system in powered on and the multimedia device is optionally not powered on, and in response to the contact, the data is "automatically" transmitted between the computer system 100 and the multimedia device 104.

For example, the camera 104, as shown in FIG. 1, can simply be placed on top of the computer system 100 so that the hot docking interface 106 of the camera is in contact with the hot docking interface 102 of computer system 100. Thereafter, the data can be exchanged without the need to connect the camera 104 and the computer system 100 via cables or wires.

In one embodiment, the multimedia device 104 does not use its own power source to transmit the data to the computer system. Instead, the multimedia device 104 may use power provided from the computer system 100 (or alternatively another multimedia device) to communicate the data. As a result, the power source of the multimedia device 104 is not drained when transmitting data to the computer system 100.

In one embodiment of the present invention, the hot docking interface 102 includes a set of pins (e.g., pressure pins) arranged to make contact with a corresponding set of pads on a separate multimedia device. Once the pins of the hot docking interface 102 are in contact with the pads of the multimedia device, data can be exchanged between the computer system 100 and the multimedia device 104, via the hot docking interfaces.

In alternative embodiments, the hot docking interface 102 of the computer system 100 may be provided with contact pads and the interface 106 of the separate multimedia device 104 may be provided with the pins. Moreover, alternative interface connectors may be used in place of the pins without departing from the scope of the invention.

Moreover, in one embodiment of the present invention, the hot-docking interfaces are configured to enhance the transmission of multimedia data (e.g., video data, graphics data, audio data). More specifically, the hot-docking interfaces include logic that implements data communication protocol that is able to transmit data at an exceptionally higher band width. For example in one embodiment, the logic of the hot-docking interfaces transmit the multimedia data in accordance with the IEEE 1394 standard, sometimes referred to as the FireWire™ communication protocol. The IEEE 1394 standard is a communication protocol for the exchange of information between electronic devices Therefore, as a result of the hot-docking interface of the present invention, electronic devices are able to communicate data without the drawbacks of using cables, wires, or infrared. Moreover, by joining the communication protocol standard of IEEE 1394 with the hot docking feature of the present invention, users are provided with the greater convenience and an enhancement in the transmission of multimedia data.

Furthermore, it should be understood that the present invention is not limited to transmitting data between a computer system and a multimedia device. The invention is applicable to the transmission of data between any two electronical devices. For example, the present invention may be used to transmit data between two separate multimedia devices, a peripheral device (e.g., a printer) and a computer system, and/or between two or more computer systems. Moreover, the data may be transmitted between the electronic devices at a lower bandwidth, which is not necessarily adapted for multimedia data transmission.

Figure 2:
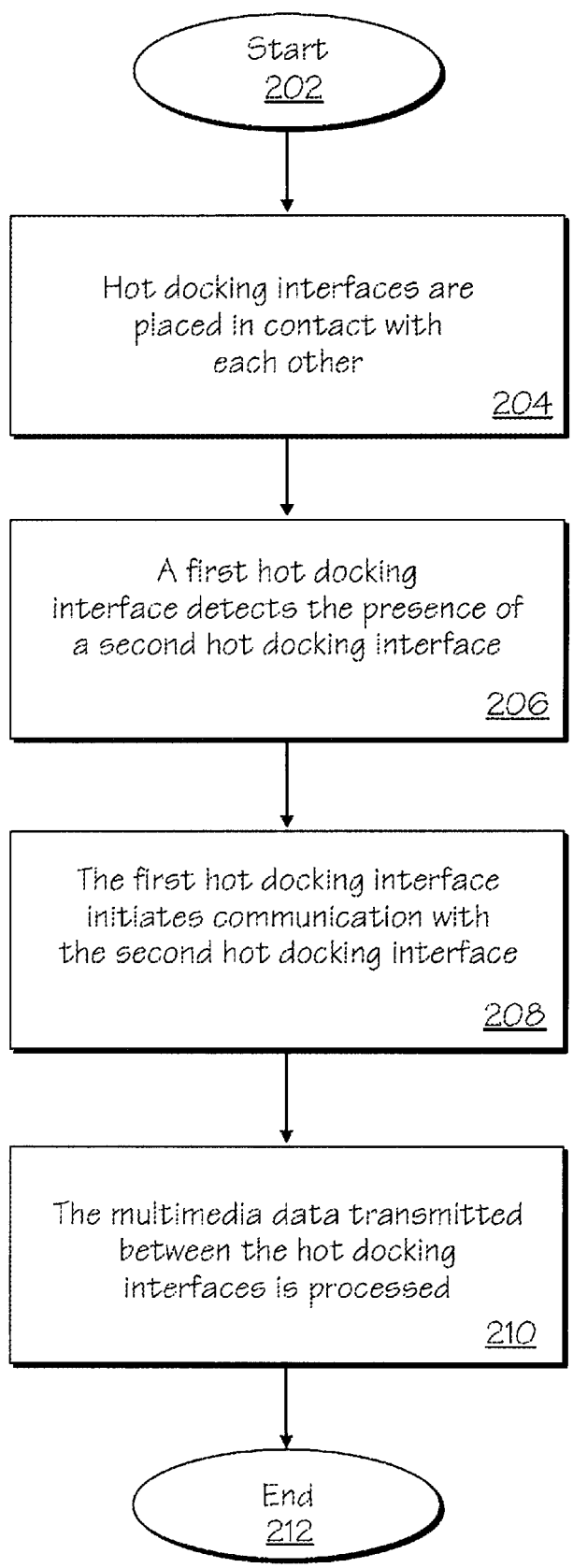
FIG. 2 illustrates a flow diagram describing the steps of providing a hot docking interface for transmitting multimedia data.

FIG. 2 illustrates a flow diagram describing the steps transmitting data between two electronic devices via the hot-docking interface of the present invention. The steps of the flow diagram illustrated in FIG. 2, are discussed below with reference to the exemplary computer system shown in FIG. 1. Flow of the invention begins in step 202 and ends in step 212. Flow passes from step 202 to step 204.

In step 204, the hot-docking interface of the multimedia device is placed in contact with the hot-docking interface of the computer system. When the multimedia device is placed in contact with the computer system, the multimedia device does not need to be in a powered-on state to have data automatically transmit to or from the computer system.

In one embodiment of the present invention, as shown in FIG. 1, the pins of the hot-docking interface 102 include at least one pin 102a for providing power, a second pin 102b serving as a ground, and additional pins provided to transmit and receive data. In one embodiment, the pin/pads of a hot-docking interface are configured to be compatible with the IEEE 1394 standard, as discussed above. In alternative embodiments, the pin/pads of a hot-docking interfaces may be configured to be compatible with a different communication protocol without departing from the scope of the present invention.

In step 206, logic 108 (e.g. hardware circuitry, a chip set, firmware, or software) of the computer system detects the presence of the multimedia device in contact with the hot-docking interface of the computer system. For example, the logic may monitor pin 102a to detect when there is a load on pin 102a (i.e., power is being drawn). In alternative embodiments, other method may be used to detect the presence of the multimedia device in contact with the computer system without departing from the scope of the invention.

In step 208, the logic 108 of the computer system initiates the communication of data between the computer system 100 and the multimedia device 104 via the hot-docking interfaces 102 & 106. In one embodiment, the logic 108 of the computer system 100 will transmits an inquiry to logic 110 of the multimedia device to determine the communication protocol that will be used to transmit the data between the multimedia device and the computer system.

As shown in FIG. 1, the logic 108 of the computer systems and the logic 110 (shown in the cut-away view in the multimedia device 104), are configured to transmit data with the computer system using the IEEE 1394 standard (e.g., Firewire™). However, this figure illustrates only one embodiment of the present invention, other communication protocols may be used without departing from the scope of the invention. Moreover, the logic 108 &110 in each electronic device may be implemented on hardware circuitry, firmware (e.g., Read Only Memory (ROM)), or possibly provided through software drivers.

In an alternative embodiment, the logic of the multimedia device 104 may initiate the communication of data to or from the computer system 100 via the hot-docking interfaces. For example, the multimedia device 104 may use the power received from the computer system to have the logic of the multimedia device send an inquiry to the computer system to determine the communication protocol for transmitting data with the computer system. Moreover, in an alternative embodiment, if the multimedia device includes a rechargeable battery, the multimedia device may also use the power from the computer system to recharge the battery.

Figure 3:
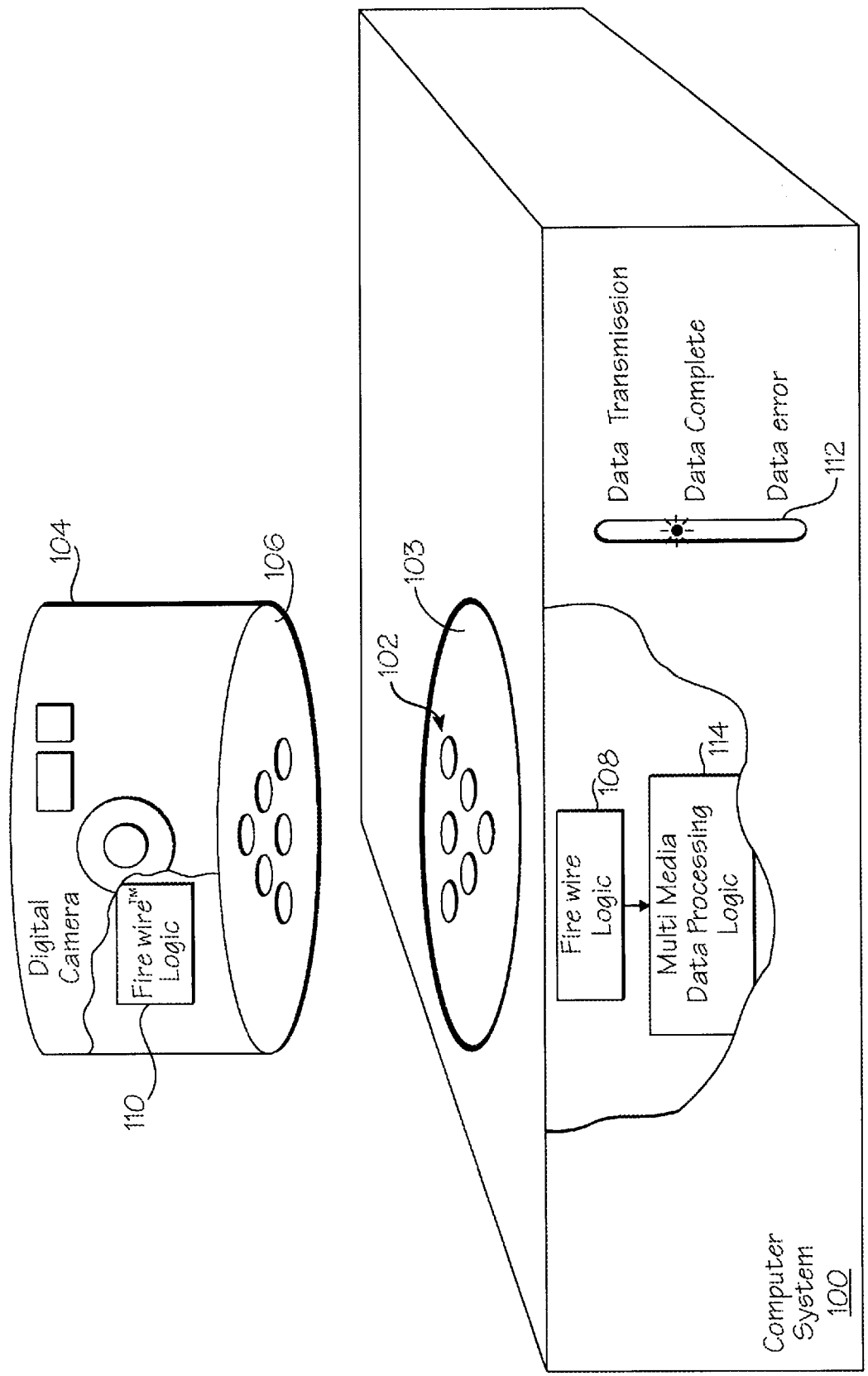
FIG. 3 illustrates a cut-away view of a computer system and a multimedia device both incorporating one embodiment of the present invention.

In addition, in one embodiment, as illustrated FIG. 3, a status indicator 112 is provided on the computer system 100 to indicate the status of the data transmission between the two devices. For example, the status indicator may identify when data is being transmitted, when data is not being transmitted, when the data transmission has completed, and/or when an error in the data transmission has occurred. Moreover, the status of the data transmission between the two devices may alternatively be indicated via audible signal (e.g., audible beeps). Furthermore, the status indicator could alternatively be provided on the multimedia device 104.

In step 210, in one embodiment, once the data has transmitted to the computer system, the logic 114 of the computer system 100 proceeds to process data. For example, the logic 114 of the computer system as shown in the block diagram of FIG. 1 (and also shown in the cut-away view of FIG. 3) may perform data compression routines on the data and then store the data in memory 116. Alternatively, the logic 114 of the computer system 100 may process the data received from the multimedia device 104 to be output or presented in a predetermined manner.

For example, in the case of the multimedia device 104 being a digital camera, the images transmitted to the computer system 100 may be displayed on a monitor, or possibly be made available on a World Wide Web (WWW) Site accessible through the Internet 118. In addition, the logic 114 of the computer system could randomly assign a Uniform Resource Locator (URL) to the images, indicating where the images can be located on the Internet. Alternatively, the logic 114 could assign a specific URL as requested by an operator of the computer system.

If the multimedia device 104 transmits alternatively audio data to the computer system, the audio data could also be processed in a similar manner. That is, the audio data could be played over a speaker attached to the computer system 100, or alternatively posted on the Internet as described above with regard to the video data.

Alternative Embodiments

As further shown in FIG. 1 and in FIG. 3, the hot-docking interface 102 of the present invention may alternatively be provided within an indentation 103 on the computer system to hold the multimedia device 104 more securely. Moreover, the hot-docking interface 102 of the present invention could be provided in a cradle on the surface of the computer system, to hold the multimedia device even more firmly.

In addition, to protect the pins of the hot-docking interface, the pin could alternatively be retractable. For example, the weight of setting down the multimedia device 104 on the surface of the computer system 100 could cause the pins to rise and make contact with the contact pads of the multimedia device 104.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A first apparatus comprising:

a memory device; and a hot docking interface, coupled to said memory device, said hot docking interface automatically transmits or receives digital image data with a digital image recording device in response to said recording device being in contact with said hot docking interface, said digital image data transmitted via a data transfer protocol of IEEE 1394 standard, wherein said hot docking interface of said first apparatus provides power to said recording device for said recording device to transmit or receive digital image data, wherein the first apparatus includes a cradle to receive said digital image recording device, wherein said hot docking interface is within said cradle.

2. The first apparatus of claim 1, wherein said hot docking interface of said first apparatus provides power to said second apparatus to recharge a battery in said second device.

3. The first apparatus of claim 2, wherein said first apparatus is a computer system and said digital image recording device is a multimedia device.

4. The first apparatus of claim 3, wherein said digital image recording device is a digital camera.

5. The first apparatus of claim 3, wherein said digital image recording device is a digital video recorder.

6. The first apparatus of claim 3, wherein said hot docking interface includes at least one pressure pin corresponding to a contact pad on a hot docking interface on said digital image recording device.

7. The first apparatus of claim 3, wherein the first apparatus includes a status indicator that identifies a status of transferring the multimedia data.

8. The first apparatus of claim 3, wherein the digital image recording device includes a status indicator that identifies a status of transferring the multimedia data.

9. The first apparatus of claim 3, wherein the first apparatus includes an indentation to receive said digital image recording device, wherein said hot docking interface is within said indentation.

10. The first apparatus of claim 6, wherein said pressure pin of said first apparatus is retractable.

11. A first apparatus comprising:

a memory device; and a hot docking means, coupled to said memory device, for automatically transmitting or receiving digital image data with a digital image recording device in response to said image recording device being in contact with said hot docking interface, said digital image data transmitted via a data transfer protocol of IEEE 1394 standard, wherein said hot docking interface of said first apparatus provides power to said recording device for said recording device to transmit or receive multimedia data, wherein the first apparatus includes a cradle to receive said recording device, wherein said hot docking means is within said cradle.

12. The first apparatus of claim 11, wherein said hot docking interface of said first apparatus provides power to said image recording device to recharge a battery in said image recording device.

13. The first apparatus of claim 11, wherein said first apparatus is a computer system and said second apparatus is a multimedia device.

14. The first apparatus of claim 13, wherein said recording device is a digital camera.

15. The first apparatus of claim 13, wherein said recording device is a digital video recorder.

16. The first apparatus of claim 13, wherein said hot docking means includes at least one pressure pin corresponding to a contact pad on a hot docking means on said recording device.

17. The first apparatus of claim 13, wherein the first apparatus includes a status indicator that identifies a status of transferring the digital image data.

18. The first apparatus of claim 13, wherein the recording device includes a status indicator that identifies a status of transferring the digital image data.

19. The first apparatus of claim 13, wherein the first apparatus includes an indentation to receive said recording device, wherein said hot docking means is within said indentation.

20. The first apparatus of claim 16, wherein said pressure pin of the hot docking means on said first apparatus is retractable.

21. A method for transmitting multimedia data comprising the steps of:

placing a first hot docking interface, of a first apparatus, in contact with a second hot docking interface, of a second apparatus;

said first hot docking interface detecting said second hot docking interface in contact with said first hot docking interface; and in response to said first hot docking interface detecting said second hot docking interface in contact with said first hot docking interface, said first hot docking interface automatically begins transmitting or receiving multimedia data with said second apparatus, wherein said hot docking interface of said first apparatus provides power to said second apparatus for said second apparatus to transmit or receive multimedia data, wherein the first apparatus includes a cradle to receive said second apparatus, wherein said first hot docking interface is within said cradle.

22. The method of claim 21, wherein said recording device is a digital camera.

23. The method of claim 21, wherein said hot docking interface of said first apparatus includes at least one pressure pin corresponding to a contact pad on a hot docking interface on said recording device.

24. The method of claim 21, wherein the first apparatus includes a status indicator that identifies a status of transferring the digital image data.

25. The method of claim 21, wherein the second apparatus includes a status indicator that identifies a status of transferring the digital image data.

26. The method of claim 21, wherein the first apparatus includes an indentation to receive said digital recording device, wherein said first hot docking interface is within said indentation.

27. The method of claim 21, wherein said pressure pin of the first hot docking interface on said first apparatus is retractable.

* * * * *